Dec. 31, 1957　　　L. R. ULLERY, JR., ET AL　　　2,818,511
RADIATION DETECTOR
Filed Oct. 13, 1953　　　　　　　　　　　　2 Sheets-Sheet 2
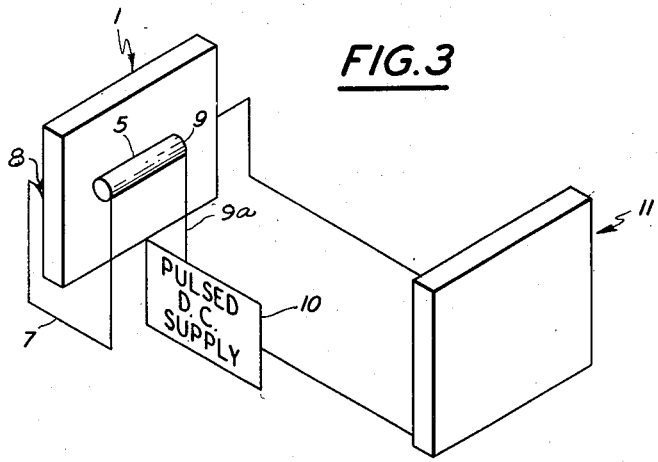
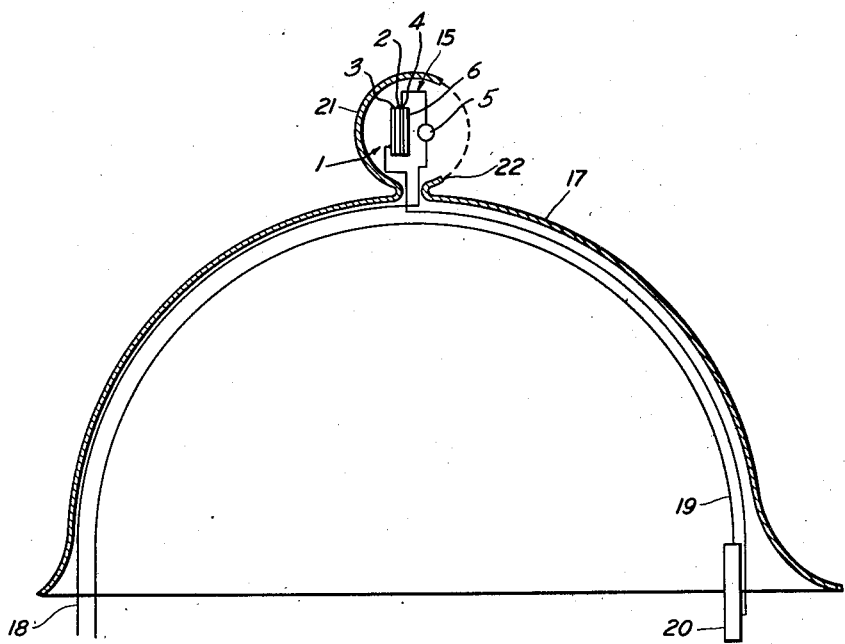
INVENTOR.
LEE R. ULLERY
RICHARD K. ORTHUBER
BY
Lockwood, Galt, Woodard, & Smith
ATTORNEYS

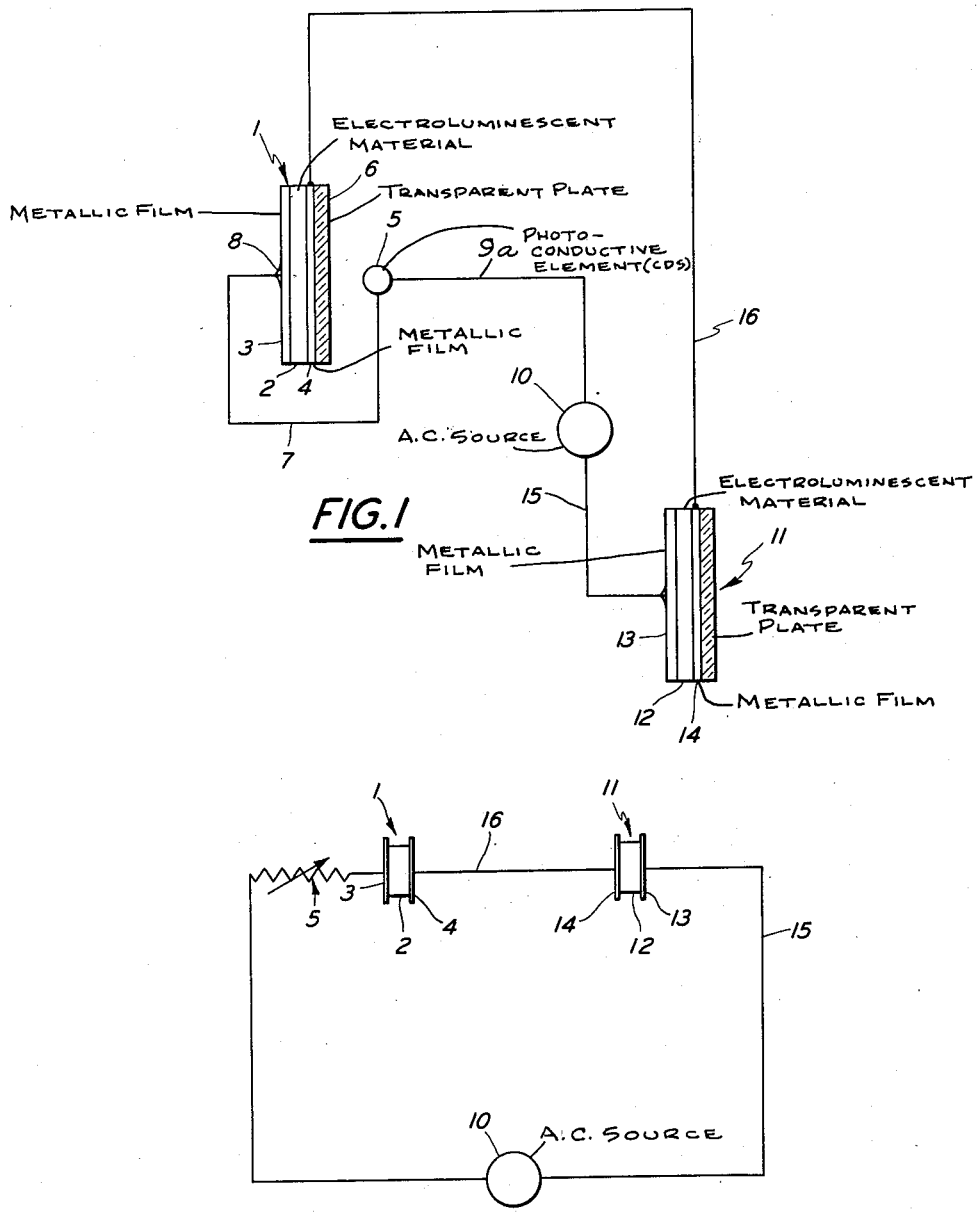

United States Patent Office 2,818,511
Patented Dec. 31, 1957

2,818,511

RADIATION DETECTOR

Lee R. Ullery, Jr., and Richard K. Orthuber, Fort Wayne, Ind., assignors to International Telephone and Telegraph Corporation Application October 13, 1953, Serial No. 385,762

10 Claims. (Cl. 250—211)

The present invention relates to a radiation detector, and more particularly to a unique device for the detecting of infrared radiation.

This invention is similar in a number of respects to the invention covered by Orthuber continuation-in-part application Serial No. 332,733, filed January 22, 1953, and other copending applications owned by the assignee of this invention. In these previous applications, a radiation-amplifying device is disclosed and claimed. Generally, the inventions of these copending applications are embodied in laminated cell constructions in which the laminae, for all practical purposes, are arranged in the manner of an ordinary parallel plate condenser having a dielectric material interposed between the condenser plates. This dielectric material is actually comprised of two parts; viz., a lamina of photo-conductive material, such as cadmium sulphide, and a contiguous lamina of electroluminescent material which is excitable to luminescence by the application thereto of a variable electric field. A typical suitable material for this electroluminescent lamina is a copper activated zinc oxide and zinc sulphide mixture as explained by Destriau in the 1937 edition, vol. 38, of Philosophical Magazine, on pages 700 to 739, 774 to 793, and 800 to 887. Other suitable materials are also described in these pages. Still further, electroluminescent materials which are currently undergoing development for use in illuminating lamps may be incorporated in this invention.

Electrically, the two different dielectric materials specified in the foregoing paragraph may be considered as being connected either in series or in parallel. With the application of an exciting alternating voltage to the two plates of the condenser, a voltage drop may be considered to exist therebetween which is the sum of the two voltage drops across the respective series-connected dielectric layers. By designing these dielectric layers in a predetermined manner, the electroluminescent dielectric may be prevented from luminescing in the absence of exciting light, but, on the other hand, caused to luminesce when light energy is projected onto the photo-conductive layer. Since these two dielectric layers are connected in series, illumination of the photo-conductive layer alters the electrical characteristics thereof so as to change the distribution of voltage division across the two individual layers in a direction to increase the magnitude of the voltage applied to the electroluminescent layer. With this increase of voltage, the electroluminescent layer will emit light of such brightness as corresponds to the change in electrical characteristics of the photo-conductive layer.

In operation, the present invention resembles the operating characteristics of the foregoing invention. The one essential difference, however, resides in the fact that the present invention is sensitive to infrared radiation, and in the preferred embodiment, is not necessarily composed of laminated construction.

It is therefore an object of this invention to provide a "solid-type" instrument capable of detecting infrared radiation.

It is another object of this invention to provide a radiation detector which is the ultimate in simplicity of construction, reliability in operation, and economy of production.

It is still a further object of this invention to provide a radiation detector which sustains itself in sensitive, detecting condition until such time as infrared radiation is projected thereonto, whereupon the detecting sensitivity is counteracted for producing a phenomenon capable with visual observation.

In accordance with the principles of this invention, a radiation detector is provided which includes means sensitive to radiation in at least two different spectral ranges, said means responding oppositely to the radiation of said two spectral ranges respectively, and radiation-producing means operatively coupled to said radiation sensitive-means to irradiate the latter in one of said spectral ranges only, the coupling between both means serving to sustain a given condition of irradiation by said radiation-producing means until such time as said radiation sensitive means is irradiated in the other of said spectral ranges.

For a better understanding of the invention, together with other and further objects thereof, reference is made to the following description, taken in connection with the accompanying drawings, the scope of the invention being defined by the appended claims.

In the accompanying drawings:

Fig. 1 is a sectional view of an embodiment of this invention, showing the various parts electrically connected together;

Fig. 2 is an equivalent circuit diagram of the embodiment of Fig. 1;

Fig. 3 is a perspective view of a typical physical arrangement; and

Fig. 4 is a sectional illustration of a helmet or cap on which the embodiment of the preceding figures is mounted.

With reference to the drawings, and more particularly to Fig. 1, an exciter, indicated generally by the reference numeral 1, of planar, laminated construction is composed of a layer of electroluminescent material 2 sandwiched between two metallic film electrodes 3 and 4, rsepectively, which may be of any suitable material such as evaporated silver or aluminum. Preferably, the film electrode 4 is made transparent so that luminescence by the layer 2 may project onto a photo-conductive element 5 supported adjacent thereto. This element 5 may be composed of a single crystal of cadmium sulphide which is sensitive to both visible and infrared radiation, such sensitivity, however, being in opposite senses. That is to say, the crystal 5 when illuminated with visible radiation will reduce in resistance or electrical impedance, while, on the other hand, will increase in resistance when it is irradiated with infrared ray radiation. This phenomenon of opposite response by cadmium sulphide photo-conductive material has been known for some time, and it is also known that all photo-conductive cadmium sulphide material is not so responsive to the different types of radiation. Therefore, in order to obtain a crystal 5 suitable for operation in this invention, it is necessary to select particular crystals which are properly responsive to the different spectral radiation ranges.

If desired, a glass or the like transparent plate 6 may be applied to the illuminating side of the exciter 1 as a reinforcement since the laminations 2, 3 and 4 are ordinarily extremely thin and are, therefore, not self-supporting.

The crystal 5 is electrically connected in series by means of a wire 7 with the film electrode 3 of the exciter 1, and the connections between the exciter and the crystal are made in any suitable manner such as by silver paste 8 between the wire 7 and the electrode 3 and by a similar connection with one end of the crystal 5 (Fig. 3). Another wire 9a leads from the opposite end 9 of the crystal 5 to a source 10 of alternating current exciting voltage, such voltage being in the order of 600 volts at 800 cycles. The exact value of voltage will depend upon the particular type of electroluminescent material 2 utilized in the exciter 1.

An indicator unit 11 which may be constructed substantially identically to exciter 1 includes a layer of electroluminescent material 12 and two plate-like electrodes 13 and 14, electrode 14 preferably being transparent so as to be able to view the luminescing condition of the electroluminescent layer 12. A wire 15 leads from the source 10 to the film electrode 13, while a wire 16 extends between the two transparent film electrodes 4 and 14.

In Fig. 2 is shown an equivalent circuit diagram of the embodiment illustrated in Fig. 1. Here, for convenience, like numerals will indicate like parts. The cadmium sulphide crystal corresponds electrically to a variable resistor, while the exciter and indicator units 1 and 11 resemble ordinary parallel plate condensers. These three components are connected in series with the source 10 being applied between the opposite ends thereof.

With the application of an A. C. voltage to this series circuit, a certain division of voltages or voltage drops will occur over the three parts 5, 1 and 11. The cadmium sulphide crystal 5 is so selected that in the absence of light it will have a sufficiently high impedance to deprive the exciter and indicator units 1 and 11, respectively, of sufficient voltage to cause luminescence of the layers 2 and 12, respectively. Further, this crystal is so selected that when visible light of a particular brightness is projected thereonto, its impedance will lower sufficiently to cause an increase in the magnitude of voltage appearing between the respective plates of the two condensers 1 and 11, respectively. With this increase in magnitude of exciting potential, the materials 2 and 12 will luminesce with a brightness corresponding to the change in resistance of the crystal 5.

Now since the lowering of the resistance of the crystal 5 serves to cause luminescence of the exciter 1, such luminescence may be trained back onto the crystal 5 so as to maintain the resistance of the latter correspondingly low. This feedback operation is a regenerative effect which serves to self-excite the system, or in other words, to sustain the condition of luminescence of the exciter 1 until an opaque barrier, for example, may separate the light of the exciter 1 from the crystal 5. When this occurs, the regenerative effect is counteracted and the resistance of the crystal 5 will increase to such a value as to deprive the exciter 1 of its normal exciting voltage.

The indicator 11 is preferably located at some point remote from the exciting assembly 1, 5 so that luminescence thereof will not irradiate the crystal 5. However, since the indicator 11 is in series with the exciter 1 its operation will follow that of the exciter.

The device may be excited into regenerative operation merely by training visible light of sufficient intensity onto the crystal 5 which causes luminescence of the exciter 1. Thereafter, no incident light from an external source is necessary to sustain the regenerative operation of the invention.

This regenerative operation may be interrupted by projecting infrared radiation onto the crystal 5. Such radiation so affects the crystal 5 that its impedance suddenly rises to a point which is sufficient to deprive or cut off exciting potential to the exciter 1 which in turn causes the latter to extinguish. With the extinguishment of exciter 1, the indicator 11 is also extinguished thereby indicating to an observer that infrared radiation has impinged upon the crystal 5. Thus, so long as the indicator 11 is providing luminescence, no infrared radiation is striking the crystal 5, but the moment such infrared radiation does strike the crystal, the indicator 11 will extinguish.

As explained earlier, all cadmium sulphide crystals which operate as photo-conductors or semi-conductors do not possess the dual attribute of responding oppositely to visible and infrared ray radiation. Thus, it is necessary to select by experiment the particular crystal suitable for operation in this invention.

A possible use to which this invention may be put is illustrated in Fig. 4. Here, the exciting assembly 1, 5 is attached by some suitable means to the topside of a helmet or hat 17 with wires 18 for applying the exciting voltage passing down the back side of the helmet 17. Other wires 19 extend beneath the forward part of the helmet for connection to the suitably located indicator 20 (same as indicator 11) which may be observed at any time by the wearer of the helmet.

Whenever the indicator 20 is extinguished, a signal is thereby presented that infrared radiation is present in the area.

Any suitable means may be utilized for mounting the exciter 1, 5 on the helmet, and in this figure, a housing 21 having an opening 22 in the forward side thereof is illustrated as being suitable.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A radiation detector comprising means sensitive to radiation in at least two different spectral ranges, said means responding oppositely to the radiation of said two spectral ranges respectively, and radiation-producing means electrically coupled to said radiation sensitive means to irradiate the latter in one of said spectral ranges only, the coupling between both means serving to sustain a given condition of irradiation by said radiation-producing means until such time as said radiation sensitive means is irradiated in the other of said spectral ranges.

2. A radiation detector comprising means sensitive to radiation in at least two different spectral ranges, said means responding oppositely to the radiation of said two spectral ranges respectively, and radiation-producing means operatively coupled to said radiation sensitive means to irradiate the latter in one of said spectral ranges only, both means being electrically intercoupled for the application thereto of an exciting electric field which causes said radiation-producing means to irradiate, said intercoupling serving to sustain a given condition of irradiation by said radiation-producing means until such time as said radiation sensitive means is irradiated in the other of said spectral range.

3. A radiation detector comprising means sensitive to radiation in at least two different spectral ranges, said means being composed of semi-conductive material which changes impedance oppositely in response to the radiation of said two ranges respectively, and radiation-producing means operatively coupled to said radiation sensitive means to irradiate the latter in one of said spectral ranges only, both means being electrically intercoupled for the application thereto of an exciting field which causes said radiation-producing means to irradiate, said intercoupling serving to sustain a given condition of irradiation by said radiation-producing means until such time as said radiation sensitive means is irradiated in the other of said spectral range.

4. A radiation detector comprising first means which is sensitive to radiation in two different spectral ranges, said means reducing in impedance in response to radiation in one of said ranges and increasing in impedance in response to radiation in the other of said ranges, second radiation-producing means operative to produce radiation lying in said one range and not in said other range, said second means being positioned to irradiate said first means and further being excitable by the application of an electric field thereto, said first and second means being electrically intercoupled in such a manner that an electric field applied to said second means will vary in response to a variation in the impedance of said first means, the irradiation of said first means by said second means serving to produce a given irradiating condition of said second means, said first means being operative to interrupt said given irradiating condition when it is irradiated in said other of said spectral ranges.

5. A radiation detector comprising a photosensitive element of the semi-conductor type, said element being responsive oppositely to radiation in two different spectral ranges, one range serving to decrease the impedance of said element whereas the other range serves to increase its impedance, an electroluminescent member mounted adjacent said element for irradiating the latter in said one range, said element and said member being connected in series whereby an exciting field applied thereto will divide across said element and said member in accordance with the impedance of said element, the irradiation from said member serving to maintain the impedance of said element sufficiently low to sustain irradiation of said member, said element being responsive to said radiation in the other range to quench irradiation by said member.

6. A radiation detector comprising a crystal of photoconductive cadmium sulphide which is responsive oppositely to radiation in the visible and infrared ranges, the visible range serving to reduce the crystal impedance and the infrared range serving to increase crystal impedance, a body of electroluminescent material positioned adjacent said crystal to illuminate the latter in said visible range, said crystal and said body being connected in series, and terminal means of applying a variable electrical field over said crystal and said body which divides across the latter in accordance with the impedance of said crystal, the luminescence from said body serving to lower the impedance of said crystal sufficiently to cause sustained luminescing of said body, said crystal being operative to increase in impedance sufficiently to extinguish said body when infrared rays are projected onto said crystal.

7. A radiation utilizing device comprising first means sensitive to radiation in at least two different spectral ranges, said means responding oppositely to the radiation of said two spectral ranges respectively, second means responsive to an electrical field for emitting radiation in one of said spectral ranges, third means electrically coupling said first and second means together, fourth means for applying an electrical field to both said first and second means whereby a change in impedance of said first means serves to change the electrical field applied to said second means.

8. A radiation utilizing device comprising first means responsive to an electrical field for emitting radiation, voltage control means electrically coupled to said first means and operative to control an electrical field applied to said first means, said voltage control means including means differently responsive to radiation in at least two different spectral ranges respectively for providing the aforesaid control, said first means emitting radiation in one of said spectral ranges and being disposed to irradiate said voltage control means.

9. A radiation utilizing device comprising first means sensitive to radiation in at least two different spectral ranges, said means responding oppositely to the radiation of said two spectral ranges respectively, second means responsive to an electrical field for emitting radiation in one of said spectral ranges, said first means being disposed in the field of radiation of said second means, third means electrically coupling said first and second means together, fourth means for applying an electrical field to both said first and second means whereby a change in impedance of said first means serves to change the electrical field applied to said second means.

10. A radiation utilizing device comprising first and second means, the first means providing radiation in one spectral range, the second means being sensitive to radiation in two different spectral ranges, one of said two ranges including said one spectral range, said first and second means being regeneratively coupled together such that irradiation of said second means in said one spectral range sustains regeneration while irradiation in the other of said two ranges terminates said regeneration.

References Cited in the file of this patent

UNITED STATES PATENTS

| | | |
|---|---|---|
| 2,236,172 | Gray | Mar. 25, 1941 |
| 2,594,740 | De Forest | Apr. 29, 1952 |
| 2,650,310 | White | Aug. 25, 1953 |